United States Patent [19]

Niedermeyer

[11] 4,340,031
[45] Jul. 20, 1982

[54] HIGH RATIO SOLAR ENERGY CONCENTRATING COLLECTOR

[76] Inventor: William P. Niedermeyer, 1024 Mt. Mary Dr., Green Bay, Wis. 54301

[21] Appl. No.: 171,097

[22] Filed: Jul. 22, 1980

[51] Int. Cl.³ .............................. F24J 3/02; G02B 5/10
[52] U.S. Cl. .................................. 126/424; 126/438; 126/451; 350/296; 350/298
[58] Field of Search ............ 126/424, 425, 438, 439, 126/451; 350/293, 298, 296, 294

[56] References Cited

U.S. PATENT DOCUMENTS

| | | | |
|---|---|---|---|
| 4,034,735 | 7/1977 | Waldrip | 126/425 |
| 4,038,972 | 8/1977 | Orrison | 126/425 |
| 4,111,184 | 9/1978 | Fletcher et al. | 126/425 |
| 4,135,493 | 1/1979 | Kennedy | 350/296 |
| 4,174,704 | 11/1979 | Nelson | 126/438 |
| 4,184,482 | 1/1980 | Cohen | 126/451 |
| 4,205,657 | 6/1980 | Kelly | 126/425 |
| 4,240,406 | 12/1980 | Hutchinson | 350/296 |
| 4,249,514 | 3/1981 | Jones | 126/438 |
| 4,256,091 | 3/1981 | Hallows | 126/438 |
| 4,281,900 | 8/1981 | Lewis | 350/296 |

Primary Examiner—Daniel J. O'Connor
Attorney, Agent, or Firm—Francis J. Bouda

[57] ABSTRACT

A solar energy concentrating collector having a concave paraboloid reflector surface supported on a plurality of segments, said segments being parabolically-shaped on the top edge and extending radially from a circle near the central axis of revolution to the periphery, and arranged to coact with a reference means which is equidistant from the central axis at all points of revolution.

The reference means may be a protrusion coacting with a cutout or other indentation on the bottom edge of a semi-parabolic shaped support whereby to insure accurate placement of reflector components for high focusing accuracy after assembly.

15 Claims, 18 Drawing Figures

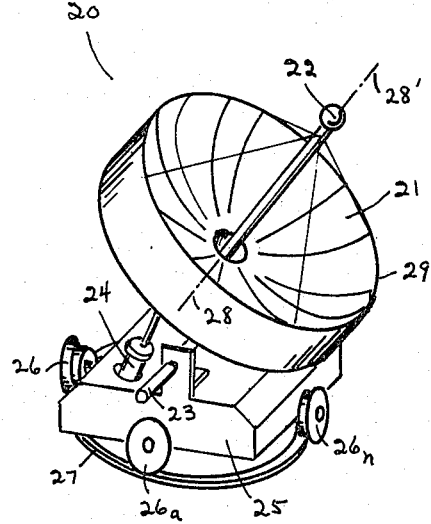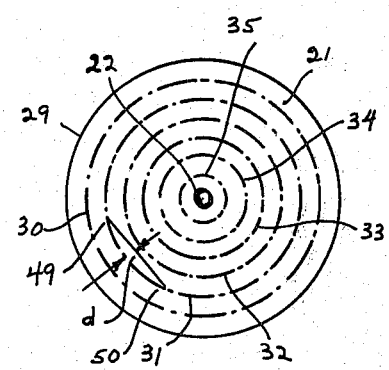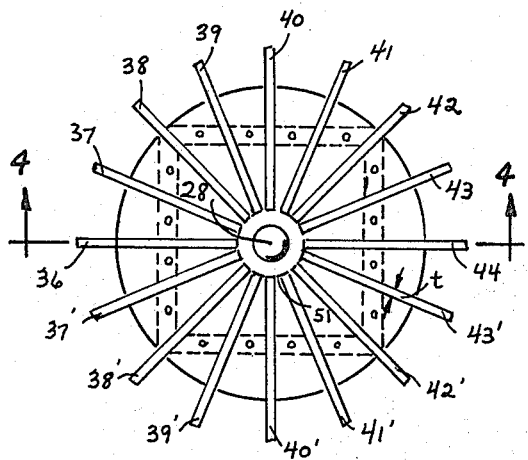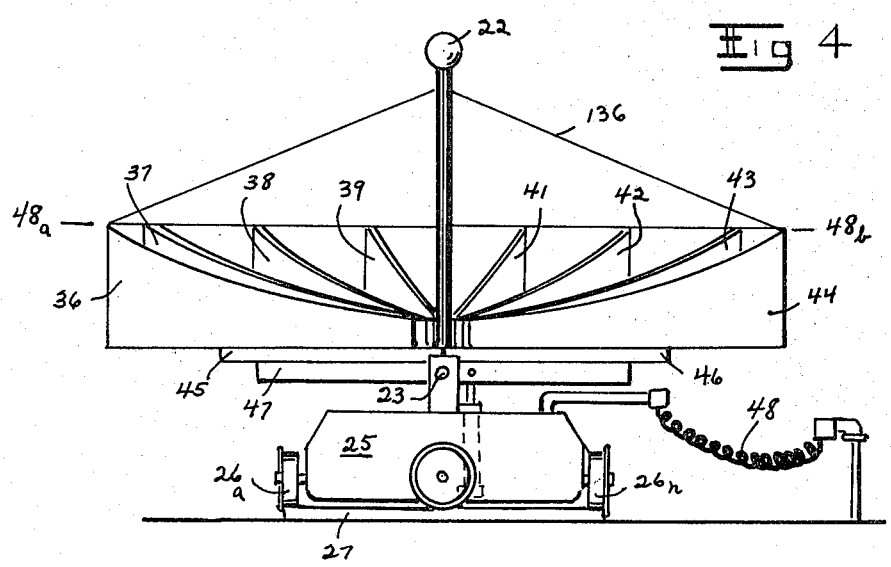

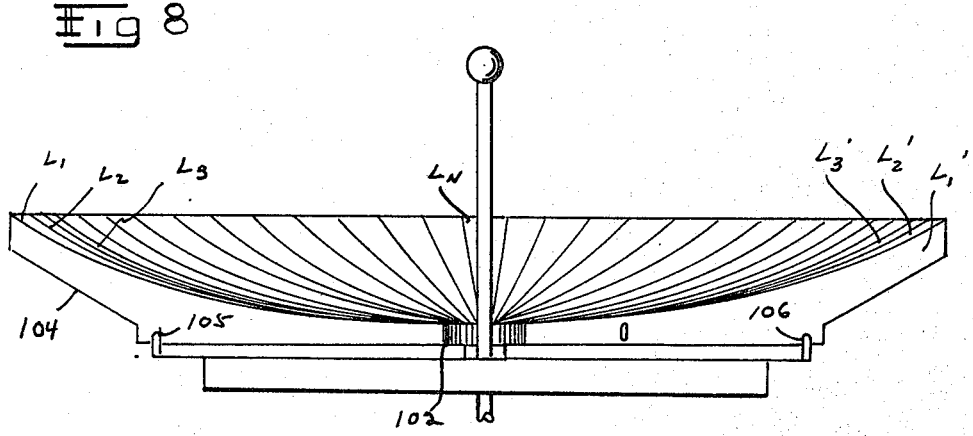
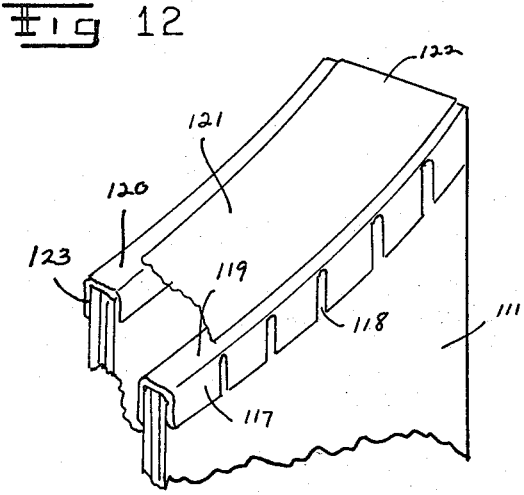
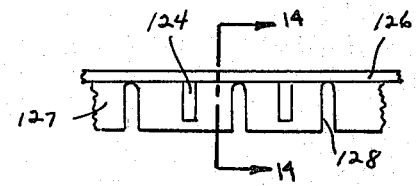
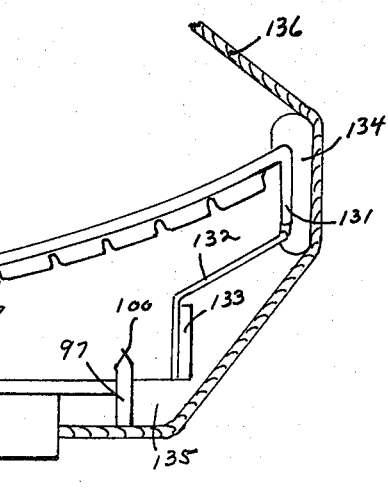
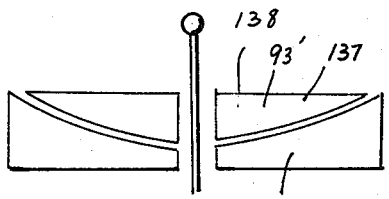

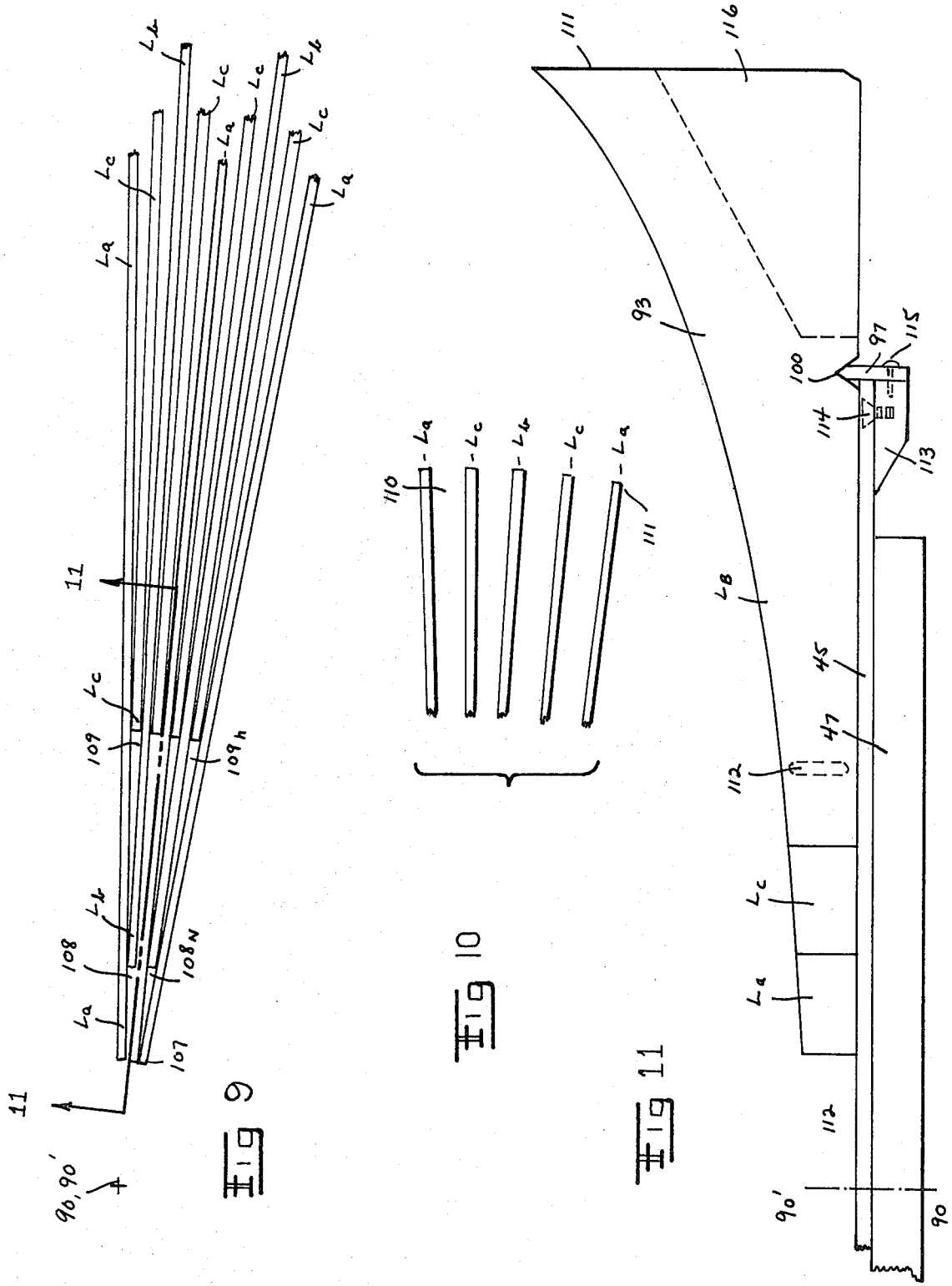

HIGH RATIO SOLAR ENERGY CONCENTRATING COLLECTOR

BACKGROUND OF THE INVENTION

Solar energy collectors to produce the high fluid temperatures required for power generation are based on well-known principles of reflectivity, and, in certain instances, the use of heliostat tracking similar to that described in U.S. Pat. No. 2,712,772.

An experimental "Power Tower" nearing completion in Barstow, California uses more than 1700 heliostats (position controlled mirrors), each having a toal area of 450 sq. ft., and each being independently pivotable biaxially to reflect solar rays to a distant receiver (reference Machine Design, July 12, 1979, pages 20–25). The solar energy power generating installation described will deliver 10 megawatts of power at an installed cost of between $10,000 to $15,000 per KW as compared with a range of about $750 to $1500 per KW for conventional coal fired or nuclear installations (1980 costs).

Design aspects of the "Solar Power Tower" are described in the Mar. 19, 1979 issue of Design News Aerospace Technology—"To gather 300 Suns".

These articles clearly indicate that heliostat design is neither simple, nor a fully matured art, and discuss problems associated with proper focusing of heliostats within accuracies of 6–10 milliradians to achieve fluid heating to about 890° F. Not the least of the design problems is the fact that the mirrors, their pedestals, and their drives must withstand high winds and earthquakes. It is noteworthy that using a large number of heliostats to concentrate solar rays onto a centrally located absorber tower is analagous to a stationary disc concentrator having a diameter equal to the peripheral dimension of the heliostat array, but with a requirement for space between each heliostat to keep it from being shaded and to allow enough space for rotational movement. Moreover, the heliostat array-central power tower represents inefficient land area usage. It is also noted that when viewed from outer space, the heliostat array is not symmetrical about the central absorber-tower, this arrangement being dictated by the fact that, as an equivalent to a large disc collector, it remains horizontal and small portions of the equivalent "disc reflector surface" are individually oriented to compensate for changes in solar angle.

As opposed to this, better utilization of the reflector area (and land use) can be achieved when the entire disc assembly and receiver can be tilted as an entity, even though there are practical limitations on the diameter of the disc and its pivoting or rotational movement about axes perpendicular to each other. "Combined" designs whereby the disc reflector and absorber are moved as an assembly are similar to that described in Machine Design of Mar. 6, 1980. These systems utilize reflector disc (paraboloids of revolution), which concentrate solar rays on an absorber mounted at the focal point of the reflector, and it is noted that because of better total reflector surface utilization (as opposed to the spaced-apart heliostats in the equivalent disc reflector of the "Power Tower"), higher concentrating ratios are possible and result in heat transfer fluid temperatures of 1500° F. when focusing solar rays from a disc reflector of 33 ft. in diameter. Disc reflectors are well adapted for smaller power generation units that can be erected in many locations—often on otherwise unuseable plots of land,—and power outputs can be integrated or readily connected to nearby and existing power grids.

The basic problem of high reflector cost with heliostats or disc-type reflectors resides in the requirement for special metal fabricating techniques to insure paraboloidic reflecting accuracy. Furthermore, due to the high accuracy and special techniques required, these reflectors must be fabricated at special facilities and then transported to the installation site as assembled or partially disassembled units due to carrier size, weight, and/or right-of-way overhead restrictions.

In this disclosure, I describe a disc reflector (paraboloid of revolution), essential components of which may be made on standard high-speed, corrugating machinery that is modified to shape parabolic supporting members according to methods similar to those described in my copending application, Ser. No. 12032.

In order to use parabolic shapes for concentrating disc reflectors, certain fundamental changes must be made to the shape and length of individual segments in order to allow for field assembly into a disc reflector of high paraboloidal accuracy.

In this regard, the previous disclosure of my U.S. Pat. No. 4,190,037 relates to similarly-shaped underlying supports. However, changes in fabricating methods and to the shape as well as arrangement of underlying supports are described as they apply to disc reflectors generically—for example, U.S. Pat. Nos. 2,460,482; 3,105,486; 3,162,189; 3,643,648; and 3,713,727.

Reflectors are currently being tested for solar ray reflection-absorption and useful heat transfer-conversion into electric power. For the purpose of distinguishing over prior art, high-intensity solar collectors, certain background information and data is discussed relative to a 33 ft. diameter reflecting disc, which, according to the above-mentioned article, can collect and convert enough solar rays for a 20 KW generating unit.

While a disc reflector having a 33 ft. diameter is described, it is understood that the principles of paraboloidal reflectivity and the methods of fabrication, transport, and assembly can apply to similar reflectors to the limits of practical size. For example, FIGS. 17 and 18 refer to disc reflectors that can be substantially larger than 33 ft. in diameter.

While prior art collectors and the collector of this invention both have paraboloidal reflective surfaces and achieve the same results, the use of inexpensive insulating materials, new fabricating methods, and different means to define the reflective shape may result in substantial reduction of manufacturing time as well as cost.

For example, by using special cutting and marking (or scoring) means described hereinafter, parabolic sections can be cut to very close tolerances at speeds of about 250 rpm. Subsequent shaping and cutting may be required, but can be done on pieces that are separated by transverse cuts. The parabolic support sections for a 33 ft. diameter paraboloid can be manufactured on a 96" wide corrugating machine in about 28 minutes. These support sections may be about 4 ft. high by about 16 ft. maximum length, and are well within accepted shipping dimensions that avoid special routing.

Since all components of the reflector are pre-fabricated in a factory and shipped for field assembly, it will become evident hereinafter that the highest degree of fabricated accuracy can be maintained after completion of field assembly.

Apart from the benefits of high-speed fabrication of accurately formed components, certain functional benefits accrue from the use of insulating members to form the paraboloid shape. Within the range of ambient temperature extremes and the small additional heat gain by absorption of non-reflected solar rays, insulating materials have excellent dimensional stability and therefore, the accurately-assembled paraboloidal reflector is not prone to distortions due to temperature differences that occur when clouds pass over or when portions of the disc reflector become shaded.

Therefore, it is an object of this invention to provide a paraboloidal disc solar ray reflector wherein the completed reflector is a combination of specially fabricated parts which can be assembled in the field.

It is a further object of this invention to define an accurately-focused solar ray reflector that can be field-assembled from accurately-made parts.

Further, it is an object of this invention to provide a reflector of insulating materials in order to avoid distortions and inaccuracy due to temperature differentials when subjected to full sunlight as opposed to partial shade or no sunlight.

It is a further object of this invention to provide a disc reflector made from inexpensive and abundant materials.

It is a further object of this invention to provide a disc reflector that can be fabricated and erected in a few days as opposed to many months of special fabrication.

A further object of this invention is to provide a disc reflector made of lightweight materials.

It is a further object of this invention to provide a coacting assembly of inverted-mating, parabolic shapes which can be readily installed to protect the paraboloidal shape in the event of hail storms.

It is a further object of this invention to provide paraboloidal disc reflectors having a total diameter substantially larger than currently known art devices by utilizing more than 1 pair of parabolic segments.

Above all, it is the primary object of this invention to provide a disc reflector at low cost so that numerous small power units can be remotely located for power decentralization.

With the above and other objects in view, more information and understanding of the present invention may be achieved by reference to the following detailed description.

DETAILED DESCRIPTION

For the purpose of illustrating the invention, there is shown in the accompanying drawings a form thereof which is at present preferred, although it is to be understood that the various instrumentalities of which the invention consists can be variously arranged and organized and that the invention is not limited to the precise materials arrangements and organizations of the instrumentalities as herein shown and described.

In the drawings, wherein like reference characters indicate like parts:

FIG. 1 is a perspective view illustrating a type of disc reflector referred to herein.

FIG. 2 is a view normal to the surface of the disc reflector.

FIG. 3 is a view similar to FIG. 2 illustrating the essential components used in constructing a disc reflector according to this invention.

FIG. 4 is a sectional side elevational view along line 4—4 of FIG. 3, illustrating the coacting rotational sub-supports.

FIG. 8 is a fragmentary side elevational view of an assembled disc reflector according to this invention with the reflector surface removed for clarity.

FIG. 9 is a plan view parallel to and along the axis of rotation showing different length reflector surface supports in juxtaposed relationship and arranged along lines radiating from the center of the disc reflector axis.

FIG. 10 is similar to FIG. 9 showing the same reflector supports terminating at vertical edges which substantially define the periphery of the reflector disc.

FIG. 11 is a side elevational section of certain reflector supports shown in FIG. 9.

FIG. 12 is a cutaway perspective view showing the top edge portion of a parabolic support and associated reflective surface attachment members.

FIG. 13 is a side view of specially shaped strips used as shaped reflector members.

FIG. 14 is a cross-sectional view of the shaped reflector members of FIG. 13 showing the tapered top portion.

FIG. 15 is a partial side view of a supporting member showing details of construction and arrangement of central absorber supporting members.

FIG. 16 illustrates how material left over from the fabrication can be used as a removable protective shield for the top reflector surface.

Figure 5:
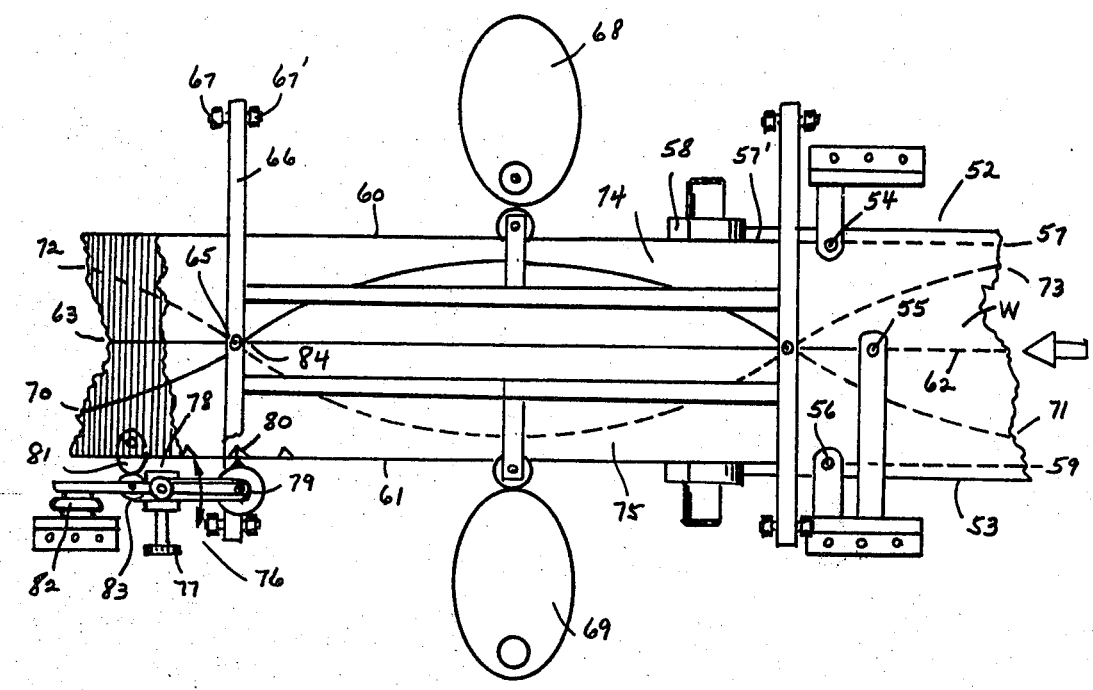
FIG. 5 is a schematic plan view illustrating the equipment used to fabricate essential components of the solar collector of the present invention.

FIG. 1 illustrates a high ratio solar ray concentrating collector 20 comprising a paraboloidal disc reflector surface 21 which re-directs impinging solar rays to be concentrated at absorber 22. The absorber is mounted at the focal point along a central axis 28–28'.

The disc reflector is arranged to pivot about horizontal axis 23–23' (not shown), and, by virtue of wheels 26 . . . $26_n$ riding on circular track 27, framework 25, shaft 23–23' and the disc reflector 21 can be rotated about vertical axis central to the circular track 27. Being thus subject to adjustable tilting and rotatable about a vertical axis, the disc reflector can assume any orientation and can, therefore, be controlled and arranged so that incoming solar rays will always be parallel to central axis 28–28' and, therefore, always properly focused on absorber 22.

FIG. 2 is a schematic drawing which illustrates that any solar ray falling upon the reflector surface 21 will be directed from the point of incidence on any concentric circle back to the focal point 22, it being understood that focal point 22 is not necessarily in the same plane that defines the top of the disc reflector (see FIG. 4).

FIGS. 2 and 3 are plan views as seen when looking in the same direction as incoming solar rays.

In FIG. 3, the reflector surface 21 has been removed for clarity to show the parabolic-shaped segments 36-44 and symmetrically-placed supports 37'-43' on the opposite side. A circular sub-base is formed from two semicircular members 45 and 46 which in turn are bolted to a sub-structure 47. Sub-structure 47 can be prefabricated in any configuration and can be shipped to the installation site while disassembled. If necessary, the circular sub-base 45-46 can be made in quadrants, or even smaller pieces for shipment.

In FIGS. 3 and 4, supports like 36-44 . . . etc., are shaped with the top edge defining a portion of a parabolic curve, said curve being defined by formula $X^2 = 2PY$ for any value of P.

With supports 37-44 projecting outwardly along radial lines from the central axis 28-28', both FIGS. 3 and 4 show the butting relationship when the supports start at circle 51. The diameter of circle 51 is a function of the number of supports and the thickness of individual supports that are in juxtaposed relationship on this circle.

It is recognized that when there is substantial space between supports, as occurs, for example, when the thickness (see right side of FIG. 3 near 43') is substantial, the reflector surface supported between the spaced supports is chordal rather than arcuate and can, therefore, reflect solar rays inaccurately. This relationship is shown in FIG. 2 whereby the maximum error is a function of the maximum distance "d" between the chord 49-50 and its associated arc. It is evident that as the space between supports decreases, chords become shorter and, therefore, the distance between the chord and its associated arc becomes very short. The focusing error due to chordal reflection between spaced supports diminishes rapidly as the space between supports is decreased, and, theoretically, becomes zero error when thin supporting members are arranged outwardly along lines that radiate from a central axis 28-28' and where the intermediate angles therebetween are infinitely small. A practical equivalent to perfect paraboloidal reflection is achieved when thin sections of parabolic supports are arranged as in FIG. 9.

In FIG. 4, solar rays collected by absorber 22 are transferred to fluid contained inside and then to heat transfer equipment etc., housed within base 25, or by using suitable flexible pipe couplings (not shown) connected to power generating equipment installed remotely.

FIG. 5 shows special mechanisms that can be added to any machine that produced a substantially continuous web, i.e., continuous foamed plastics forming machines, or, more specifically, a paperboard corrugating machine.

A web W having edges 52-53 and moving from right to left passes under three water jet cutting devices 54-55-56. Jet cutter 54 severs the web along line 57-57' and the unwanted portion is fed into a "trim" chopper-blower 58, and thence to a remote collection area (not shown). Likewise jet cutter 56 trims the bottom of the web along line 59-59'. This operation provides clean-cut, top edge 60 and bottom edge 61, both of which become the bottom supporting edge of separate segments when the upstanding parabolic shapes are used as undersupports for the reflector surface. At the same time, jet cutter 55 cuts web W along line 62-63 as it moves to the left.

Jet cutters 64-65 are fixedly mounted on the "H" framework 66. The framework is arranged with rollers 67-67' . . . etc., and by action of cam 68 or 69, will move transversely to the web direction (CD and perpendicular to line 62-63). Leftward movement of the web and transverse motion of the framework/cutters is related and defined according to the parabolic formula $X^2 - 2PY$, and, therefore, cutter 65 severs the web along line 70-71 and cutter 66 severs the web along line 72-73—it being noted that upper portion 74 and lower portion 75 each defines a parabolic shaped support, albeit they are inverted from each other until subsequent cutoff and handling.

"Marking" mechanisms 76 and 76' (not shown) place printed or scored marks on edges 61 and 60 respectively. Each marker consists of a proper drive input 77, gear box 78, and a timing belt drive (unnumbered) to rotate roller 79 at web speed. A blade 80 (or printing plate) extends outward from roller 79 to contact and mark the web along edge 61 whenever the rotating roller is positioned in web contacting relationship by cam 81. Air cushion 82 is simply used as a counterforce means to insure continuous contact of cam 81 and the associated cam roller 83 under high-speed conditions. It is understood that the cam drive (not shown) and the cam profile are interrelated and can be adapted so that blade 80 contacts the web directly under the inflection point (as at 84-84') and hence, a mark will be directly below the zenith at each end of the parabolic section. For reasons discussed hereinafter, the preferred marking includes a plurality of at least 2 additional marks spaced symmetrically about the central mark—at least one of these additional marks each falling on or within separate but adjacent parabolic sections.

In the case of marking with three marks, the roller 79 and extending blade 80 are held in contacting relationship with the web edge 61 for 3 revolutions of roller 76.

Figure 6:
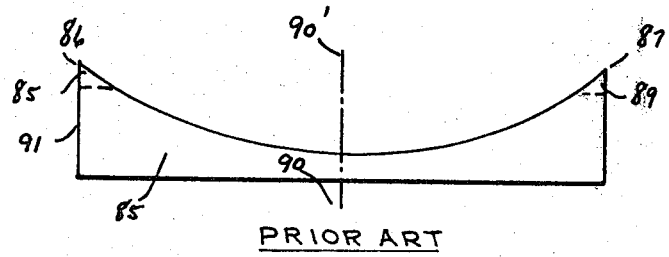
FIG. 6 is a parabolic support used to construct a trough-like parabolic collector according to prior art.

FIG. 6 shows an insulating support according to U.S. Pat. No. 4,190,037. In this prior art, the parabolic support 85 extends continuously from zenith 86 to zenith 87. As described in the above patent, top portions 88-89 can be removed to expose top support surfaces for glazing or other top mounted members.

The full parabolic shape per FIG. 6 is in keeping with requirements for trough collectors as well as "flat plate" collectors having a plurality of parabolic depressions—all according to U.S. Pat. No. 4,190,037.

Misalignment of parabolic supports 85 about central focal plane 90-90' has an adverse effect on linear trough collector efficiency, but it is not significant because the focal point is relatively close to the reflector—usually within a range of 0.2W to 0.8W, where W is the distance from zenith to zenith of the trough collector. Other means, including the use of "extended fins" on the absorber can compensate for misalignment. In essence, focusing errors are always undesirable, but transverse misalignment of parabolic supports 85 are limited to the variance between the zenith 86 and web cutoff—as at edge 91 of FIG. 6. Even at high speed, this variation of about 1/16 to $\frac{1}{8}$" is tolerable with trough collectors, but would have a significant adverse effect when these supports are applied to the disc reflector of the present invention.

Recognizing that larger disc reflectors are used to focus large areas of reflected solar rays to a concentrated focal point with resultant high temperatures, compensating means such as extended fins on the absorber reduce the concentration ratio and the high temperature limit, and thus are counter-productive to compensating for any reflector inaccuracies.

In order to maintain close assembly accuracy in present disc reflectors, a closely held reference point must be provided so that offset between cut edge 91 and zenith 86 can be rendered ineffective as a factor contributing to assembly error. In this invention, offset variations are automatically compensated for when parabolic half segments are placed on top of and "straddle" a reference ring (see 97 on the lower right part of FIG. 11).

In differentiating over U.S. Pat. No. 4,190,037, it is noted that full width parabolic sections cannot be used to generate the disc paraboloid unless mortise and tenon interlocking joints are provided. However, as more parabolic sections are added to avoid chordal, rather than arcuate, reflection (see 49–50 of FIG. 2), the width of the mortise cut becomes increasingly larger for each parabolic support that is added. As a result, each parabolic support 85 as applied to a disc reflector, must be fabricated differently from other supports without any means or methods available to pre-determine the width of cut that must be made. Cuts of pre-determined width do not assure interlocking fit due to expected and indeterminate production variations in the thickness of the supports, especially when using corrugating medium.

Figure 7:
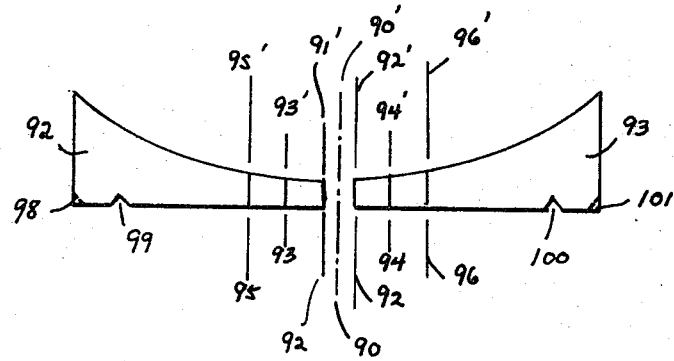
FIG. 7 shows fundamental changes in the length of underlying supports as well as the spaced relationship of segments as required to generate a disc reflector of paraboloidal shape according to the present disclosure.

FIG. 7 shows the special half-parabolic shaped supports 92–93. When constructing a disc reflector of (for example) 33 ft. diameter, and based on a thickness of 0.341" per support, three sets of reflector supports of different lengths must be used. With a total of 720 half supports, 180 of the longest supports will be in juxtaposed butting relationship when the inside edges are on a circle (containing 91–91' and 92–92') of about 19.55" and, therefore, the longest half segment will be half the disc diameter minus half the circle diameter—in this instance, about 188.23".

Since these longest supports radiate outwardly on radial lines 2 degrees apart, the space between 2 juxtaposed supports increases away from central axis 90–90' until the space between two juxtaposed supports is equal to the thickness of the support. This occurs at a diameter represented by lines 93–93' and 94–94', and in this instance dictates that 180 supports must be about 178.45" long and radiate outwardly from a circle having a diameter of 39.1" to the outside diameter of 198.00 inches. Again the space between the first plurality of supports and the second plurality of supports (see FIG. 9) increases outwardly from the second butting location, and as soon as this space is equal to the thickness of the support, a third plurality of different length supports is interjected between adjacent pairs as described hereinafter relative to FIG. 9.

If the cutoff mechanism on the fabricating machine is in register with the zenith of the parabolic segment (inflection of the curve), accurate alignment is possible without special precaution at the time of assembly. It is noted, however, that once the parabolic shape is cut to length, it is difficult to detect the zenith of the curve—this being especially true if very large, relatively flat parabolas are made sequentially and continuously as described. With the register marks added at the base, these marks will be in register with the zenith of the curve before and after cutoff of the segment, and regardless of any potential misregister of cutoff with the zenith of the curve; hence, with the reference mark or notch added, overall length is no longer critical for installed accuracy, and end trimming becomes optional instead of necessary.

FIG. 8 is a view like FIG. 4 and shows a greater plurality of supports $L_1, L_2, L_3 \ldots L_n$ and mating but separated pieces $L_1', L_2', L_3', \ldots L_n'$ to define a concave paraboloidal shape which supports the reflective surface (removed for clarity).

Since the maximum length of the longest supports (for example, 92–93 of FIG. 7) is less than the radius of the disc, a central opening 102 (see FIG. 8) is advantageously used as a passage for fluid input and output piping which is contained within central absorber support 103. After all the parabolic half-segments are assembled, an outer peripheral covering 104 is used to protect the supports from the elements. Reference marks or cutouts 105, 106 are shown in coacting relationship with an accurately-located reference "ring" 97 - (see FIG. 11 for details).

FIG. 9 is viewed with the axis 90–90' of the paraboloid being normal to the paper. Parabolic shaped supports are viewed looking at the top shaped edges of $L_a$, $L_b$ and $L_c$.

In this embodiment (FIG. 9) shaped supports of various lengths are shown—support $L_a$ being longest. For illustration, only a partial arcuate portion of the assemblage is shown, and illustrates how the longest supports $L_a$ are butted against each other (as at 107) and, as they radiate toward the periphery of the paraboloid, the space $108 \ldots 108_n$ between two adjacent supports increases. When this gap is substantially equal to the thickness of the insulating support, a second plurality $L_b$ of supports radiate outwardly toward the periphery of the paraboloid and the space between adjacent supports increases. When space 109 is substantially equal to the thickness of the supports, another plurality of supports $L_c$, each of which is shorter than $L_a$ and $L_b$, are inserted into spaces $109 \ldots 109_n$ between each pair of adjacent supports. Depending on the accuracy required near the periphery of the paraboloid (discussed above as chordal or arcuate reflection), additional pluralities of supports can be added outwardly of the last installed plurality of supports.

It should be recognized that for maximum accuracy of the paraboloidal shaped inner surface, the thickness of each support should be minimum, and a maximum number of pluralities of different length supports should be used so as to effectively fill all of the "void" spaces between adjacent supports—especially near the periphery.

It is also noted that while the description covers the advantageous use of corrugating machines for high speed output, the disc-type reflector-collector (and methods described) are not limited to use of corrugated paperboard. For example, supports can be made from foamed plastics or other suitable insulators that are readily cut by water jet cutters. Once the paraboloidal shape is generated, there are several ways to apply a reflective surface, at least one of which is described hereinafter.

The supports in FIG. 10 are a continuation of the topmost 5 supports in FIG. 9 and show how the spacing 110 increases to be a maximum at edge 111 (see also FIG. 11).

In FIG. 11, support 93 is like the parabolic shape of the right side of FIG. 7. Shape 93 can be comprised of members $L_a, L_c, L_b \ldots$ etc., per FIGS. 9 and 10 where supports are unequal in length and are in butting juxtaposed planar relationship on more than one circle.

Shaped supports $L_a \ldots L_n$ are placed on top of base 45 which, in turn, is mounted on top of sub-support 47. Reference ring 97 seats in notch 100 and is held in fixed relationship to central axis 90–90' by attachment to base 45 via clips 113 and fasteners 114, 115.

Cutouts or abutments 112 can be useful as a means to pull a plurality of supports $L_{a-c-b-c-a}$ as a group toward the center axis, expecially when substantially all of the supports are installed and/or in the event that the thickness of each support and the aggregate thickness is greater than expected, thus leaving little room for the remaining supports. Special assembly tools can be used to "wedge" the remaining supports in place.

Sections 116 or similar cutouts can be removed to reduce the overhung loads and total reflector weight.

In FIG. 12, support piece 111 is made from corrugated paperboard. A formed metal or plastic strip 117 with cutouts 118, conforms to, and covers, the top-shaped edge and provides support areas 119–120 for reflective material 121 which is tapered from a maximum (as at 122) to a dimension substantially equal to the thickness of the support (as at 107 of FIG. 9).

In FIG. 13, top reflective surface 126 is integral with strip 127 which has notches 128 and support ribs 124. FIG. 14 shows that the reflective surface is symmetrical about the support with outer edges 129–130 being in butting contact with adjacent reflective surfaces after installation (not shown). In FIG. 12, the inverted "U" shaped support 117 is shown as being slipped over the top of insulation support 111, it being understood that the outside width of strip 117 after installation can be equal to the width of support piece 111. In certain embodiments, the reflective material can be coated to protect it from abrasion or other weathering effects.

FIG. 15 shows a support 93 properly positioned relative to the central axis 90–90' by the straddling relationship of notch 100 over ring 97. Strip 127 and reflective surface 130 are attached along the shaped top edge and are bent downward to reach point 131 at the periphery. Tape or other flexible pieces can be wrapped around the top and/or periphery of the disc reflector.

Peripheral pieces 132 and ring 133 simply protect the edge of the reflector supports from the elements. At several locations, cable guides 134 and 135 allow cable 136 to be properly bent and anchored within sub-support 47 where the cables can be adjustably attached for takeup. (Adjustable means not shown). Cables 136 are shown in FIG. 4 attached to the central absorber for the purpose of supporting it in the center of the disc.

FIG. 16 shows how certain cutouts 93' can be used to coact with the reflector surface, and, with a mortise and tenon interlocking arrangement to hold pieces 150 together (See FIG. 5), a top assembly 137 including cover 138 can be used to protect the lightweight metallic reflective surface in the event of severe weather.

Figure 17:
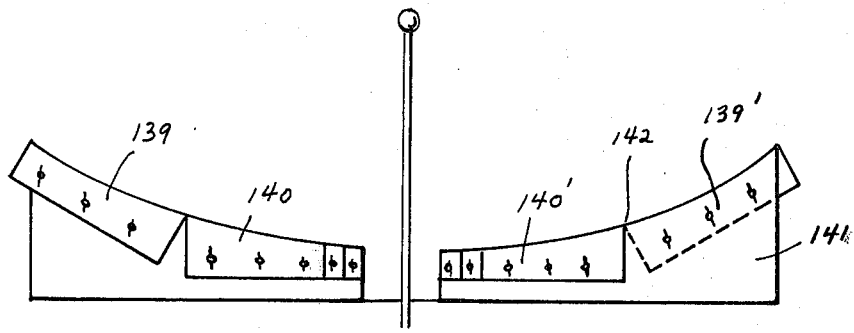
FIG. 17 is a sectional side elevational view of a solar collector showing how pairs of similarly shaped parabolic segments can be arranged to form portions of a larger parabolic shape.

In FIG. 17, a parabolic curve is made from sections 139–139' and 140–140' which are fastened to a secondary support 141 at pre-determined locations. Each section has slotted holes to allow for proper adjustment and focusing after field assembly.

This embodiment can be used to construct parabolic curves that are too large to be fabricated at one time on the corrugating or forming machine. In this instance, proper location of the notch at a pre-determined position of a co-acting reference member can be made, said reference member being affixed to the same side of the secondary support for the approximate location of the curved upper support segments 139 . . . etc.

When segments like 139 and 140 are produced according to the method of FIG. 5, one cam profile is used to generate the shape of segment 139 and 139', and a second but different cam profile is used to generate the shape of the outer segments 140 and 140'.

When used in this embodiment, each segment is cut in close register with the zenith of the curve; or, each segment is purposely cut (or subsequently trimmed) to be short. When assembling short segments, there will be a small gap 142 between two successive segments that are attached to the same secondary sub-support; however, this small gap does not materially affect the accuracy of the half parabolic curve, nor the focusing accuracy of the reflective surface that it supports.

Figure 18:
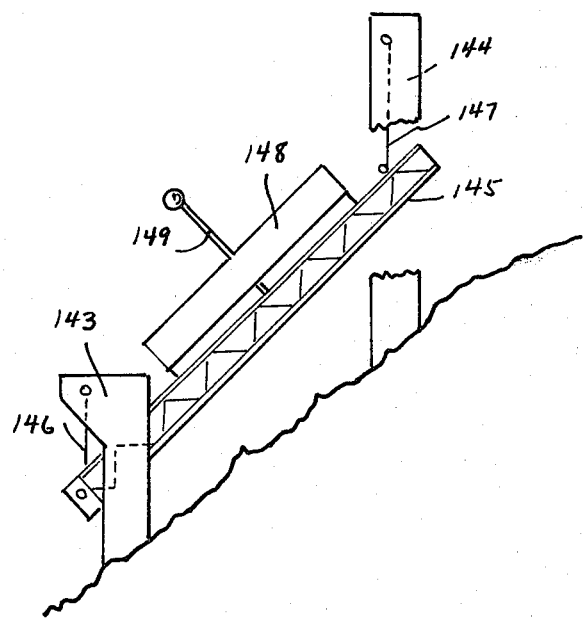
FIG. 18 shows a large paraboloidal reflector supported by a truss-like structure which can be biaxially oriented by suspending the reflector at four points.

FIG. 18 shows a typical tower structure 143–144 from which framework 145 is suspended at four points. By individually adjusting the length of cables 146–147 . . . etc., the large segmented reflector disc 148 can be oriented so that incoming solar rays are parallel with the central axis 149.

It is to be understood that the energy concentrating collector of the present invention has equal applicability to receiving and concentrating radio waves as well as solar waves, and hence the device of the present invention will provide an inexpensive, parabolic, energy wave receiver for collecting and concentrating TV and radio signals from instant radio and television satellites.

It is to be understood that the present invention may be embodied in other specific forms without departing from the spirit or special attributes hereof; and it is, therefore, desired that the present embodiments be considered in all respects as illustrative, and, therefore, not restrictive, reference being made to the appended claims rather than to the foregoing description to indicate the scope of the invention.

Having thus described my invention, what I claim as new and desire to protect by Letters Patent are the following:

1. A concentrating solar energy collector comprising:
    a disc reflector, said reflector being a a paraboloid of revolution:
    a heat absorbing means located at the focal point along the axis of the reflector and arranged for heat transfer to a fluid medium contained therein;
    a reflective disc support means whereby said disc reflector can be pivotally rotated about at least two axes that are perpendicular to each other;
    said disc reflector including a plurality of parabolic shaped supports arranged with planar surfaces parallel to the axis of revolution of said reflector,
    and a reflective surface installed on top of said supports wherein at least some of said shaped supports have a length measured along its major straight edge that is less than the width of the reflector, and wherein an abutment is disposed along said major straight edge, and wherein said abutment coacts with a circular member which is concentric about the axis of the paraboloid.

2. The device of claim 1 wherein said shaped supports are made of heat-insulating materials.

3. The device of claim 1 wherein said supports are made of corrugated paperboard materials.

4. The device of claim 1 wherein said reflector surface is made from a plurality of wedge-shaped members.

5. The device of claim 1 wherein said reflector surface is applied in diametral strips.

6. The device of claim 4 wherein said reflective strips are convolutely placed with respect to the axis of the paraboloid.

7. The device of claim 1 wherein said reflective surface is a coating applied to a substrate.

8. The device of claim 1 wherein said reflective surface is covered with a substantially transparent top coating.

9. The device of claim 1 wherein said reflective surface is a laminate having a reflective upper surface.

10. The device of claim 1 wherein the reflective surface is metallic.

11. The device of claim 10 wherein the metallic surface is an extruded wedge-shaped strip having a downwardly inverted "U" shaped extension.

12. The device of claim 1 wherein the reflective surface is a reflectively treated plastic material.

13. The device of claim 4 wherein the plurality of wedge-shaped members are plastic.

14. The device of claim 12 wherein the plastic material is cut to wedge-shaped strips having downwardly inverted "U" shaped extensions.

15. The device of claim 3 wherein said corrugated paperboard comprises at least two corrugated plies.

* * * * *